US012743917B2

(12) United States Patent
Song et al.

(10) Patent No.: US 12,743,917 B2
(45) Date of Patent: Sep. 22, 2026

(54) SYSTEM AND METHOD OF DISPLAYING A VEHICLE PASS

(71) Applicant: GM Global Technology Operations LLC, Detroit, MI (US)

(72) Inventors: Chulho Song, Mapo-gu (KR); Minseok Jeon, Gimpo City (KR); Bongbum Back, Incheon (KR); Gaurav Talwar, Novi, MI (US)

(73) Assignee: GM Global Technology Operations LLC, Detroit, MI (US)

(*) Notice: Subject to any disclaimer, the term of this patent is extended or adjusted under 35 U.S.C. 154(b) by 0 days.

(21) Appl. No.: 18/909,709

(22) Filed: Oct. 8, 2024

(65) Prior Publication Data

US 2026/0100083 A1 Apr. 9, 2026

(51) Int. Cl.
*G07C 9/00* (2020.01)
*G06K 19/06* (2006.01)

(52) U.S. Cl.
CPC .... *G07C 9/00896* (2013.01); *G06K 19/06112* (2013.01)

(58) Field of Classification Search
CPC ......... G07C 9/00896; G06K 19/06112; G06K 7/01; G06K 19/00; B60R 16/037; B60K 35/00; G06F 17/00; B60N 2/02
USPC .................................................. 340/5.1, 7.63
See application file for complete search history.

(56) References Cited

U.S. PATENT DOCUMENTS

| | | | | |
|---|---|---|---|---|
| 6,335,681 | B1 * | 1/2002 | Ontiveros | B60Q 1/503 340/472 |
| 7,076,083 | B2 * | 7/2006 | Blazey | G07C 9/20 382/100 |
| 9,218,498 | B2 * | 12/2015 | Dabosville | H04L 63/123 |
| 9,534,913 | B2 * | 1/2017 | Newlin | G01C 21/3676 |
| 9,873,395 | B2 * | 1/2018 | Park | B60N 2/0279 |
| 10,144,289 | B2 * | 12/2018 | Lee | B60K 35/22 |
| 10,360,567 | B2 * | 7/2019 | Bergdale | G06Q 10/02 |
| 10,589,720 | B1 * | 3/2020 | Tang | G07C 9/00309 |
| 10,762,733 | B2 * | 9/2020 | Bergdale | G07C 9/21 |
| 11,475,752 | B2 * | 10/2022 | Kim | G08B 21/24 |
| 2003/0066883 | A1 * | 4/2003 | Yu | G06Q 20/04 235/382 |
| 2003/0105641 | A1 * | 6/2003 | Lewis | G06Q 30/02 705/5 |
| 2004/0030658 | A1 * | 2/2004 | Cruz | G06Q 20/367 705/65 |
| 2012/0166298 | A1 * | 6/2012 | Smith | G06Q 20/3276 235/494 |

(Continued)

FOREIGN PATENT DOCUMENTS

EP 3432274 A1 1/2019

*Primary Examiner* — Nam V Nguyen
(74) *Attorney, Agent, or Firm* — Honigman LLP; Matthew H. Szalach

(57) ABSTRACT

A computer-implemented method that, when executed by data processing hardware, causes the data processing hardware to perform operations comprising uploading one or more vehicle passes to a database in communication with a vehicle, associating the one or more vehicle passes with one or more display criteria stored in the database, determining whether the one or more display criteria are present, and displaying one of the one or more vehicle passes on one or more displays arranged on the vehicle based on the one or more display criteria.

19 Claims, 5 Drawing Sheets

(56) References Cited

U.S. PATENT DOCUMENTS

2015/0025921 A1* 1/2015 Smith ................. G07F 17/0014
705/5
2022/0101306 A1* 3/2022 Rule .................. G06Q 20/3278

* cited by examiner

SYSTEM AND METHOD OF DISPLAYING A VEHICLE PASS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates generally to a vehicle and, more particularly, to a method of displaying a vehicle pass within a vehicle operating environment.

Vehicles and/or users of vehicles commonly require one or more passes to gain access to a parking garage, a car wash, a parking lot, or a gas station, for example. Some passes are required to be coupled or attached to a windshield or another area of the vehicle so that they are visible to a detection device (e.g., a scanner) or an attendant positioned at a distance from the vehicle. Attaching several passes to the windshield can cause clutter and/or hinder a driver and/or passenger's field of view. Shortcomings of existing systems will be addressed by one or more aspects of the present disclosure.

SUMMARY

In one configuration, a computer-implemented method that, when executed by data processing hardware, causes the data processing hardware to perform operations is provided. The operations include uploading one or more vehicle passes to memory hardware in communication with a vehicle, associating the one or more vehicle passes with one or more display criteria stored in the memory hardware, determining whether the one or more display criteria are present, and displaying one of the one or more vehicle passes on one or more displays arranged on the vehicle based on the one or more display criteria.

The method may include one or more of the following aspects or steps. For example, uploading the one or more vehicle passes to the memory hardware further can include capturing a picture of the one or more vehicle passes with a mobile device.

According to at least one aspect, uploading the one or more vehicle passes to the memory hardware can further include providing credentials for one or more driver profiles.

According to another aspect, associating the one or more vehicle passes with the one or more display criteria further includes gathering global positioning system (GPS) data. Determining whether the one or more display criteria are present can further include continuously evaluating the GPS data.

According to at least one example, determining whether the one or more display criteria are present can further include determining whether one or more vehicle passes were manually selected using an infotainment system of the vehicle.

According to another example, determining whether the one or more display criteria are present can further include evaluating whether a key fob or digital key is in a vicinity of the vehicle.

According to at least one aspect, determining whether the one or more display criteria are present can further include evaluating whether a mobile device is in a vicinity of the vehicle.

According to another aspect, displaying one of the one or more vehicle passes on the one or more displays can further include displaying at least one of a barcode or a quick-response (QR) code.

According to at least one example, displaying one of the one or more vehicle passes on the one or more displays further includes displaying at least one of plain text or an emblem.

In another configuration, a system is provided and includes one or more displays arranged on a vehicle, data processing hardware, and memory hardware in communication with the data processing hardware, the memory hardware storing instructions that, when executed on the data processing hardware, cause the data processing hardware to perform operations. The operations include uploading one or more vehicle passes to the memory hardware, associating the one or more vehicle passes with one or more display criteria stored in the memory hardware, determining whether the one or more display criteria are present, and displaying one of the one or more vehicle passes on the one or more displays based on the one or more display criteria.

The system may include one or more of the following optional aspects or steps. For example, associating the one or more vehicle passes with the one or more display criteria can further include gathering global positioning system (GPS) data. Determining whether the one or more display criteria are present can further include continuously evaluating the GPS data.

According to at least one aspect, displaying one of the one or more vehicle passes on the one or more displays further includes displaying at least one of a barcode or a quick-response (QR) code.

According to another aspect, displaying one of the one or more vehicle passes on the one or more displays further includes displaying at least one of plain text or an emblem.

In another configuration, a vehicle management system of a vehicle is provided and includes a sensor system including one or more sensors, one or more displays arranged on the vehicle, data processing hardware, and memory hardware in communication with the data processing hardware, the memory hardware storing instructions that, when executed on the data processing hardware, cause the data processing hardware to perform operations. The operations include uploading one or more vehicle passes to the memory hardware, associating the one or more vehicle passes with one or more display criteria stored in the memory hardware, determining whether the one or more display criteria are present, and displaying one of the one or more vehicle passes on the one or more displays based on the one or more display criteria. The vehicle management system may include one or more of the following optional aspects or steps. For example, determining whether the one or more display criteria are present can further include continuously evaluating GPS data.

According to another aspect, determining whether the one or more display criteria are present can further include evaluating whether a mobile device is in a vicinity of the vehicle.

According to at least one example, displaying one of the one or more vehicle passes on the one or more displays can further include displaying at least one of a barcode or a quick-response (QR) code.

According to another example, displaying one of the one or more vehicle passes on the one or more displays can further include displaying at least one of plain text or an emblem.

BRIEF DESCRIPTION OF THE DRAWINGS

The drawings described herein are for illustrative purposes only of selected configurations and are not intended to limit the scope of the present disclosure.

Corresponding reference numerals indicate corresponding parts throughout the drawings.

DETAILED DESCRIPTION

Figure 1:
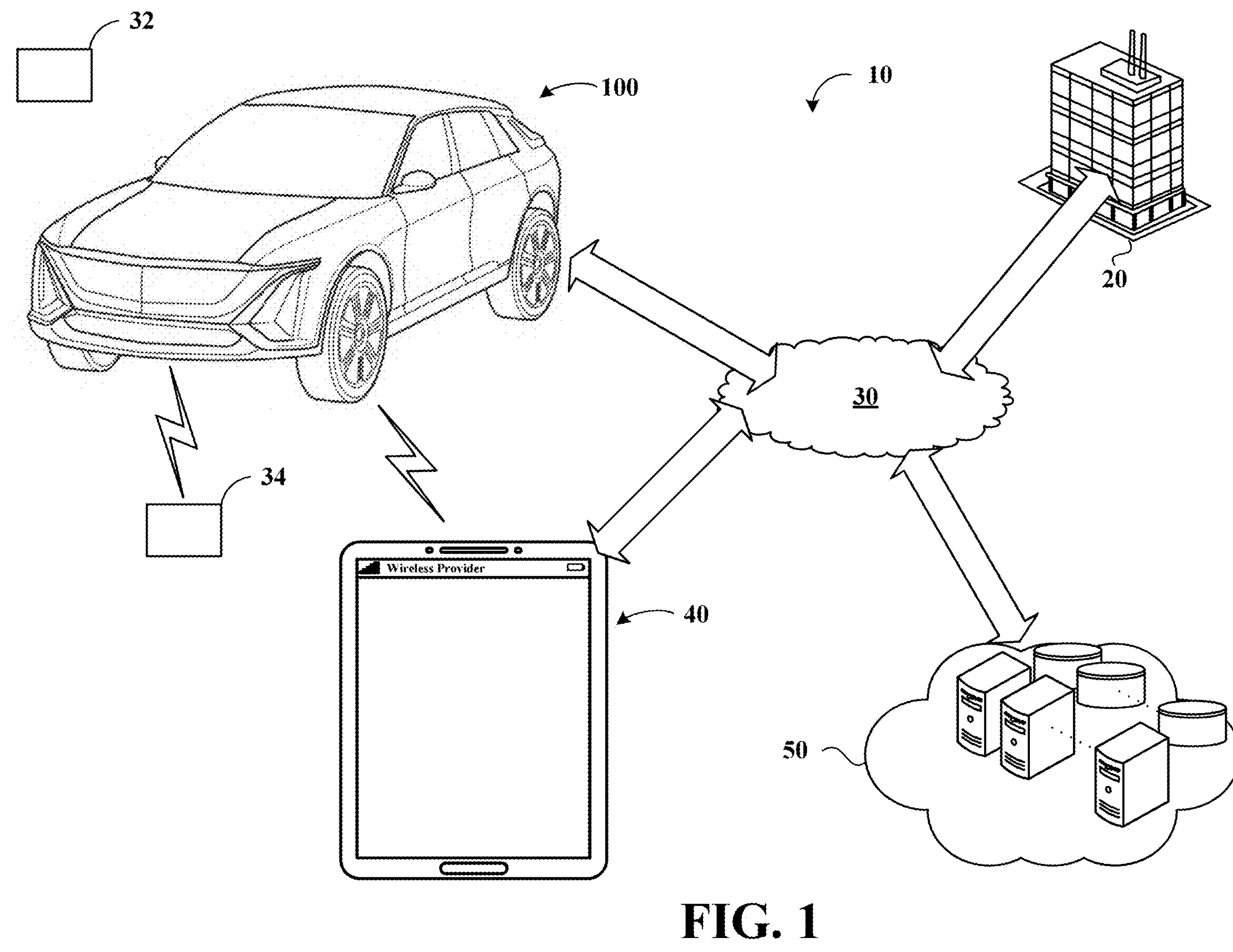
FIG. 1 is a schematic view of a vehicle operating environment including a vehicle and a vehicle management system according to principles of the present disclosure.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms "first," "second," "third," etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

In this application, including the definitions below, the term "module" may be replaced with the term "circuit." The term "module" may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term "code," as used above, may include software, firmware, and/or microcode, and may refer to programs, routines, functions, classes, and/or objects. The term "shared processor" encompasses a single processor that executes some or all code from multiple modules. The term "group processor" encompasses a processor that, in combination with additional processors, executes some or all code from one or more modules. The term "shared memory" encompasses a single memory that stores some or all code from multiple modules. The term "group memory" encompasses a memory that, in combination with additional memories, stores some or all code from one or more modules. The term "memory" may be a subset of the term "computer-readable medium." The term "computer-readable medium" does not encompass transitory electrical and electromagnetic signals propagating through a medium, and may therefore be considered tangible and non-transitory memory. Non-limiting examples of a non-transitory memory include a tangible computer readable medium including a nonvolatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

These computer programs (also known as programs, software, software applications or code) include machine instructions for a programmable processor, and can be implemented in a high-level procedural and/or object-oriented programming language, and/or in assembly/machine language. As used herein, the terms “machine-readable medium” and “computer-readable medium” refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term “machine-readable signal” refers to any signal used to provide machine instructions and/or data to a programmable processor.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user’s client device in response to requests received from the web browser.

Applying one or more vehicle passes to a windshield or another window of a vehicle can be unsightly or cause clutter that can interfere with one or more passengers’ field of view. As will be discussed in more detail below, selectively displaying one or more vehicle passes based on one or more display criteria may be desirable to reduce clutter and provide an improved driving experience for one or more passengers, for example. Shortcomings of existing systems and methods will be addressed by one or more aspects of the present disclosure.

Referring to FIG. 1, an example vehicle operating environment 10 is provided for illustration of the principles of the present disclosure. The vehicle operating environment 10 includes a vehicle 100 and a vehicle service center 20. For the sake of illustration, the vehicle operating environment 10 is shown as including a single vehicle service center 20. However, in other examples, the vehicle operating environment 10 may include a plurality of vehicle service centers 20 in communication over a network 30 (e.g., the Internet, cellular networks). The vehicle operating environment 10 also includes one or more detection devices 32, such as one or more cameras or one or more sensors. Additionally, the vehicle operating environment can include a key fob 34 in communication with the vehicle 100 and/or a mobile device 40 in communication with the vehicle 100 and/or the network 30.

Figure 2:
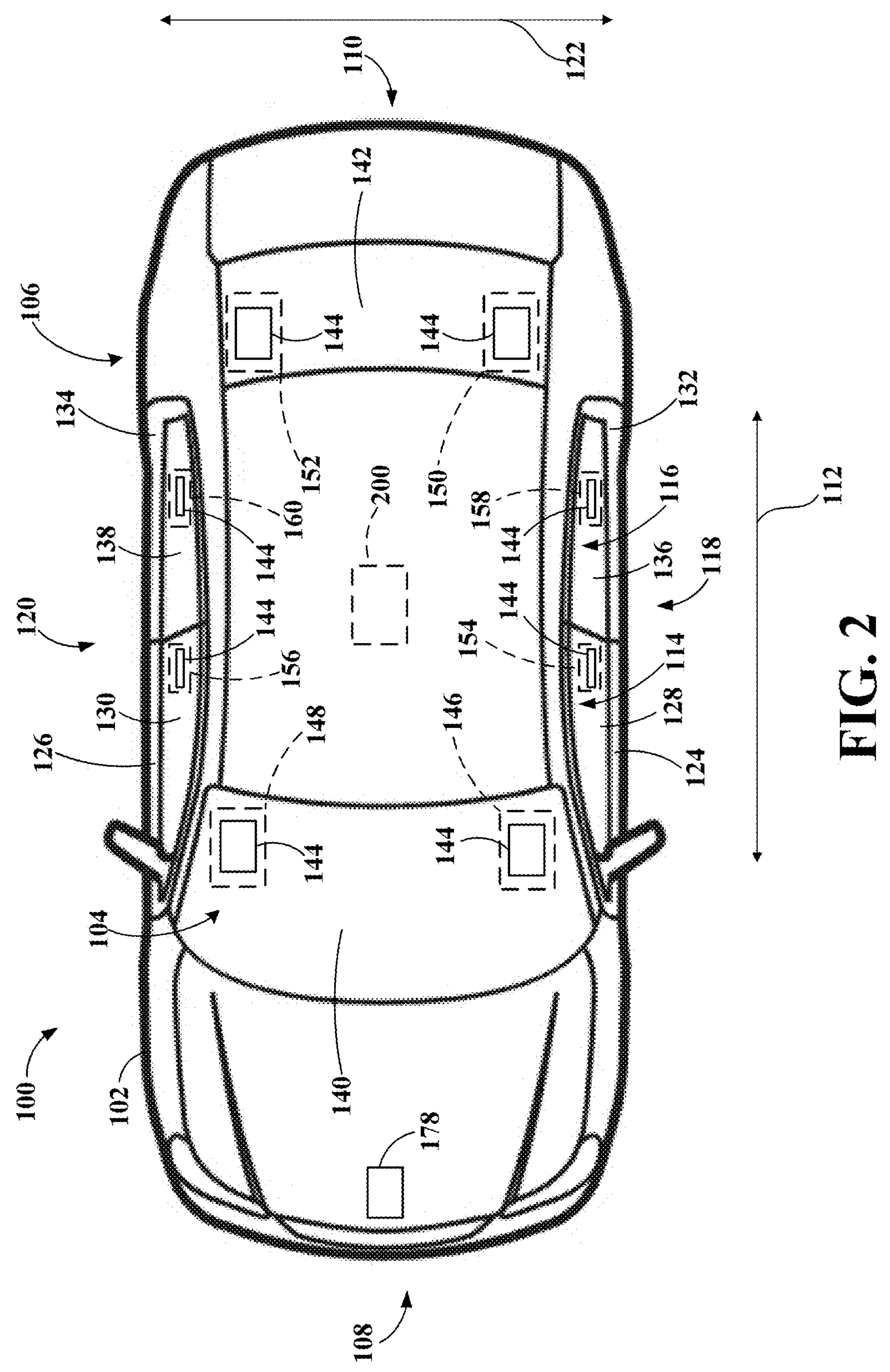
FIG. 2 is a top view of the vehicle of FIG. 1 according to the principles of the present disclosure.

With reference to FIG. 2, the vehicle 100 can have a vehicle body 102, which has a vehicle interior 104 and a vehicle exterior 106. The vehicle body 102 has a first or front end 108 spaced fore-aft from a second or rear end 110 with respect to a longitudinal axis 112. The vehicle 100 has a first or front passenger compartment 114 near the front end 108 and a second or rear passenger compartment 116 spaced fore-aft from the front passenger compartment 114 toward the rear end 110. In this example, the front passenger compartment 114 and the rear passenger compartment 116 each have a first or driver side 118 and a second or co-pilot side 120 spaced cross-car from the driver side 118 with respect to a lateral axis 122. The lateral axis 122 is perpendicular to the longitudinal axis 112. The driver and co-pilot sides 118, 120 may be on different sides (i.e., left or right) depending on the region of the world for which the vehicle 100 is manufactured. For the purposes of the present disclosure, the driver side 118 is on the left side and the co-pilot side 120 is on the right side of the vehicle 100 with respect to the lateral axis 122. Note, the present disclosure equally applies to vehicles where the driver side is on the right side of the vehicle and the co-pilot side is on the left side of the vehicle.

With continued reference to FIG. 2, one or more closures (e.g., doors, tailgate, etc.) may be coupled to the vehicle body 102 of the vehicle 100. For instance, a front left passenger compartment door 124 and a front right passenger compartment door 126 may be coupled to the vehicle body 102 to enclose the front passenger compartment 114. The front left passenger compartment door 124 includes a front left window 128 and the front right passenger compartment door 126 includes a front right window 130. A rear left passenger compartment door 132 and a rear right passenger compartment door 134 may be coupled to the vehicle body 102 to enclose the rear passenger compartment 116. The rear left passenger compartment door 132 can include a rear left window 136 and the rear right passenger compartment door 134 can include a rear right window 138. While not readily shown in the figures, the front passenger compartment doors 124, 126 and the rear passenger compartment doors 132, 134 may each have an interior door trim that can include one or more door handles, a door lock, and one or more speakers, for example. The vehicle 100 includes a front windshield 140 coupled to the vehicle body 102 near the front end 108 and a rear window 142 coupled to the vehicle body 102 near the rear end 110.

With continue reference to FIG. 2, the vehicle 100 can include one or more displays 144 arranged on or in the vehicle body 102 so that the one or more displays 144 (FIG. 3) are visible from the vehicle exterior 106, for example. In the present illustrative configuration, the one or more displays 144 can be arranged with respect to the front windshield 140, the rear window 142, and/or the one or more windows 128, 130, 136, 138 of the passenger compartment doors 124, 126, 132, 134. More particularly, the one or more displays 144 can be arranged on the front windshield 140 in a first or front left position 146 and/or second or front right position 148. Additionally or alternatively, the one or more displays 144 can be arranged on the rear window 142 in a first or rear left position 150 and/or a second or rear right position 152. Additionally or alternatively, the one or more displays 144 can be arranged on the windows of the one or more of the passenger compartment doors in a first or front left side position 154, a second or front right side position 156, a third or rear left side position 158, and/or a fourth or rear right side position 160. Note, the one or more displays can be arranged in other areas on or in the vehicle body 102 as well. According to one aspect, the one or more displays 144 can be an integral part of the front windshield 140, the rear window 142, and/or the one or more windows 128, 130, 136, 138 or the one or more displays 144 can be a separate component mounted on the front windshield 140, the rear window 142, and/or the one or more windows 128, 130, 136, 138 so that the one or more displays 144 can be viewed from the vehicle exterior 106.

Figure 3:
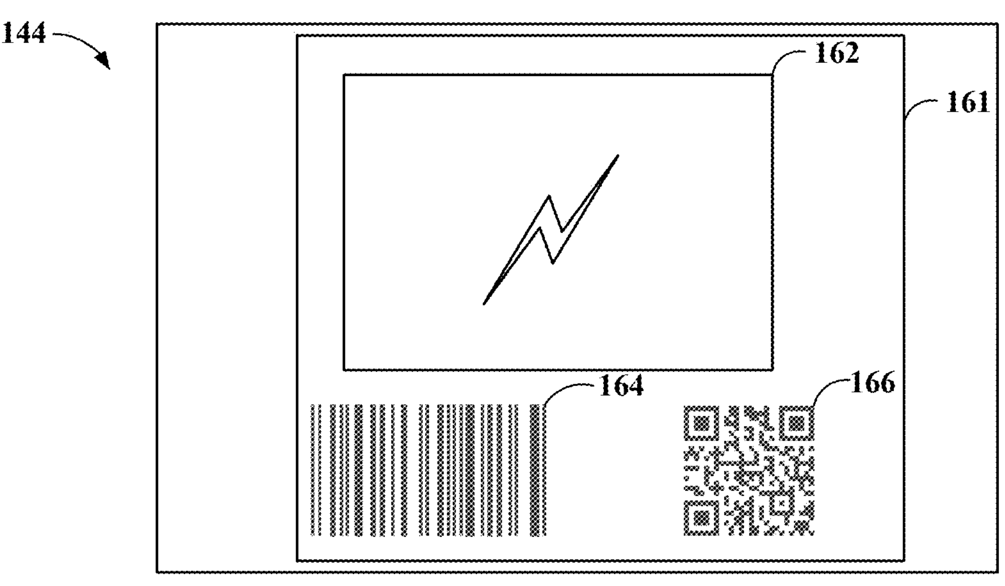
FIG. 3 is a front view of a display according to the principles of the present disclosure.

With reference to FIG. 3, the one or more displays 144 can be configured to display one or more vehicle passes 161 that include plain text (e.g., brand name, medical information, etc.) or an emblem (e.g., logo, sticker, trademark, etc.) 162, a barcode 164, and/or a quick-response (QR) code 166 that is visible from the vehicle exterior 106 in high light and/or low light scenarios and readable by the one or more detection devices 32 in the vehicle operating environment 10. In at least one instance, the one or more vehicle passes 161 can include logos for clubs, emblems for sports teams, trademarks for organizations, etc. The one or more displays 144 can be configured to receive instructions to display plain text 162, the barcode 164, and/or the QR code 166 when one or more display conditions are met, for example.

Figure 4:
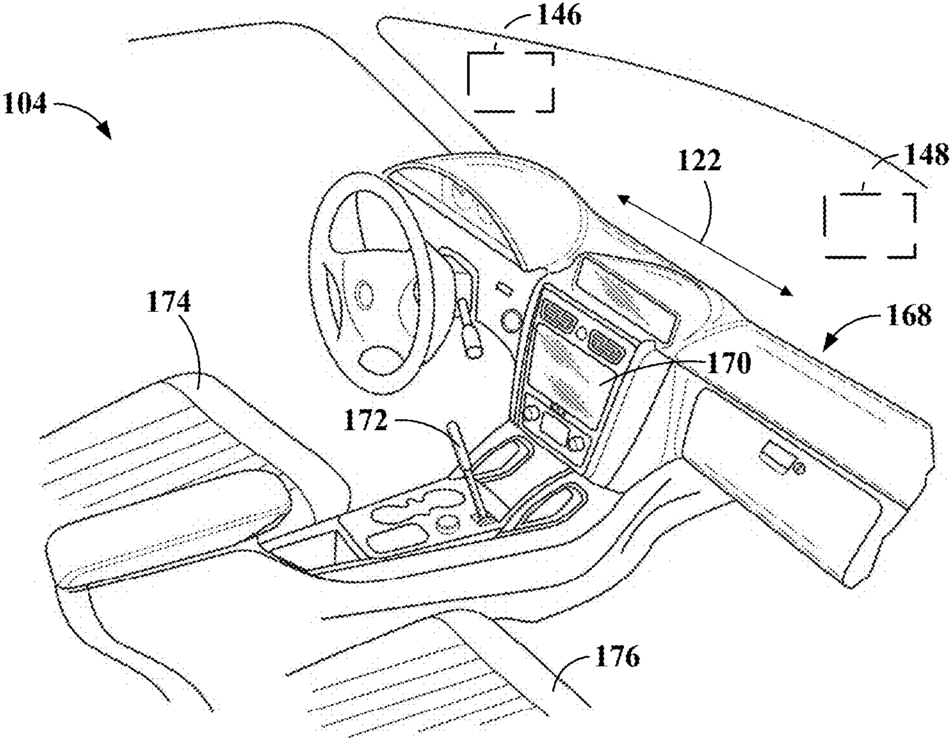
FIG. 4 is a fragmentary perspective view of an interior of the vehicle of FIG. 1.

With reference to FIG. 4, an example configuration of the vehicle interior 104 of the vehicle 100 is provided. An instrument panel 168 is arranged in the vehicle interior 104 and extends with respect to the lateral axis 122. An infotainment system or display 170 can be coupled to or arranged on or in the instrument panel 168. A shifter 172 may be arranged cross-car between a front left seat 174 and the front right seat 176 so that an operator of the vehicle 100 can change a gear status (i.e., park, reverse, neutral, drive, low) of the vehicle 100.

With reference again to FIG. 2, the vehicle 100 may include a sensor system 178 that includes one or more sensors (e.g., cameras, radars, wheel speed sensors, impact sensors, etc.) arranged on or within the vehicle body 102.

Figure 5:
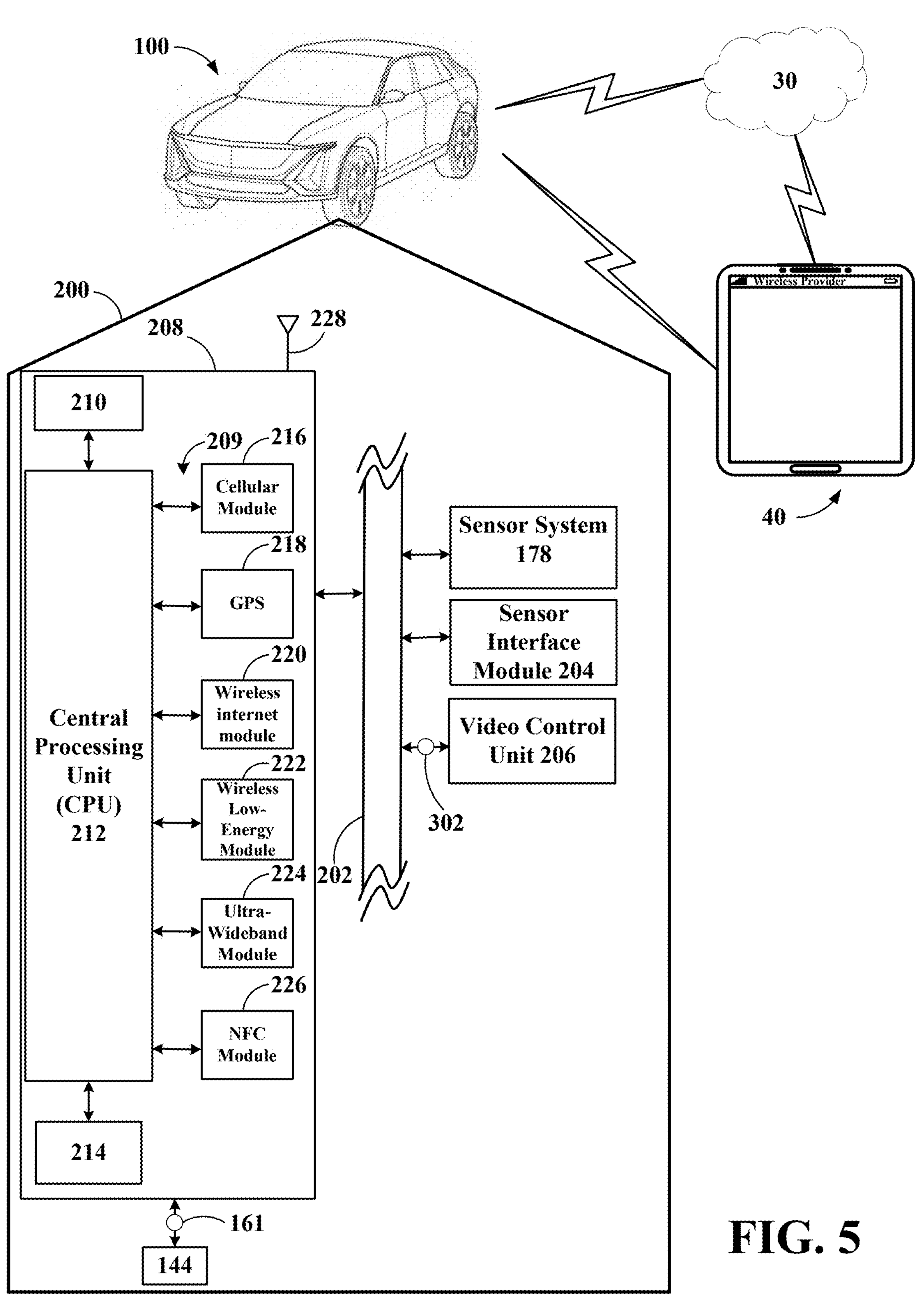
FIG. 5 is a schematic view of the vehicle management system of FIG. 1.

With reference to FIG. 5, the vehicle 100 may be equipped with a vehicle management system 200 (e.g., a telematics unit) that comprises a network connection interface 202. In the present example, the network connection interface 202 is communicatively coupled to the vehicle management system 200. Some examples of the network connection interface 202 may include twisted pair/fiber optic Ethernet switch, internal/external parallel communication bus, a local area network (LAN) interface, a controller area network (CAN), a media-oriented system transfer (MOST), a local interconnection network (LIN) interface, and the like. Other communication interfaces may also include those that conform with ISO, SAE, and IEEE standards and specifications. The network connection interface 202 enables components of the vehicle management system 200 to send and receive signals with each other and with various systems and subsystems both within or "resident" to the vehicle body 102 and outside or "remote" from the vehicle body 102. This allows the vehicle 100 to perform various vehicle functions, such as communicating with the mobile device 40 via peer-to-peer communication or via the network 30 (i.e., through cellular or wireless internet). The vehicle management system 200 can receive and/or transmit data to/from one or more electronic control units (ECUs) such as a sensor interface module 204 and a video control unit 206, for example. The vehicle management system 200 may also communicate with additional ECUs such as an engine control module (ECM), a powertrain control module (PCM), a transmission control module, a brake system control module (BSCM), a climate control module (CCM), etc.

With continued reference to FIG. 3, the vehicle management system 200 can include a communication system 208 (e.g., an onboard computing device) that provides several functions, both individually and through its communication with other networked devices. For instance, the communication system 208 can wirelessly communicate (e.g., via cell towers, base stations, and/or mobile switching centers (MSCs), etc.) with a remotely located or off board cloud computing system 50 (FIG. 1) via the network 30 or with the mobile device 40. The communication system 208 is generally composed of data processing hardware 210, each of which may be embodied as a discrete microprocessor, an application specific integrated circuit (ASIC), or a dedicated control module. The vehicle 100 may offer centralized vehicle control via a central processing unit (CPU) 212 that is operatively coupled to memory hardware 214, each of which may take on the form of a CD-ROM, magnetic disk, IC device, semiconductor memory (e.g., various types of RAM or ROM), etc. The vehicle 100 can include wireless communication technology 209 comprising long-range vehicle communication capabilities and close-range vehicle communication capabilities. The long-range vehicle communication capabilities with remote, off-board networked devices may be provided via one or more or all of a cellular chipset or module 216, a navigation and location chipset or module 218 (e.g., global positioning system (GPS)), or a wireless internet (Wi-Fi®) chipset or module 220. The close-range wireless connectivity may be provided via a close-range wireless communication device such as a wireless low-energy chipset or module 222 (e.g., a Bluetooth® Low Energy (BLE)), an ultra-wideband (UWB) chipset or module 224, and a near field communications (NFC) chipset or module 226, and/or a dual antenna 228.

The CPU 212 may receive data from one or more sensing devices of the sensor system 178 that are configured for cellular communication, wireless internet communication, low-energy wireless communication, ultra-wideband communication, and/or near-field communication, or for other communication with the network 30 and/or the mobile device 40. In accordance with present disclosure, the vehicle 100 may be equipped with one or more sensors for each wireless communication technology 209. The one or more sensors of the sensor system 178 may be arranged on or within the vehicle 100 and configured to receive wireless communication signals of cellular communication, wireless internet communication, low-energy wireless communication, ultra-wideband communication, and/or near-field communication, for example The mobile device 40 (e.g., a smartphone) may be configured to communicate with the wireless communication technology 209 directly or via the network 30, and more specifically, communicate with one or more of the cellular module 216, the navigation and location module 218, the wireless internet module 220, the wireless low-energy module 222, the UWB module 224, and/or the NFC module 226.

The one or more displays 144 can be communicatively coupled to the communication system 208 so that the one or more displays 144 can receive instructions to display the one or more vehicle passes 161.

Figure 6:
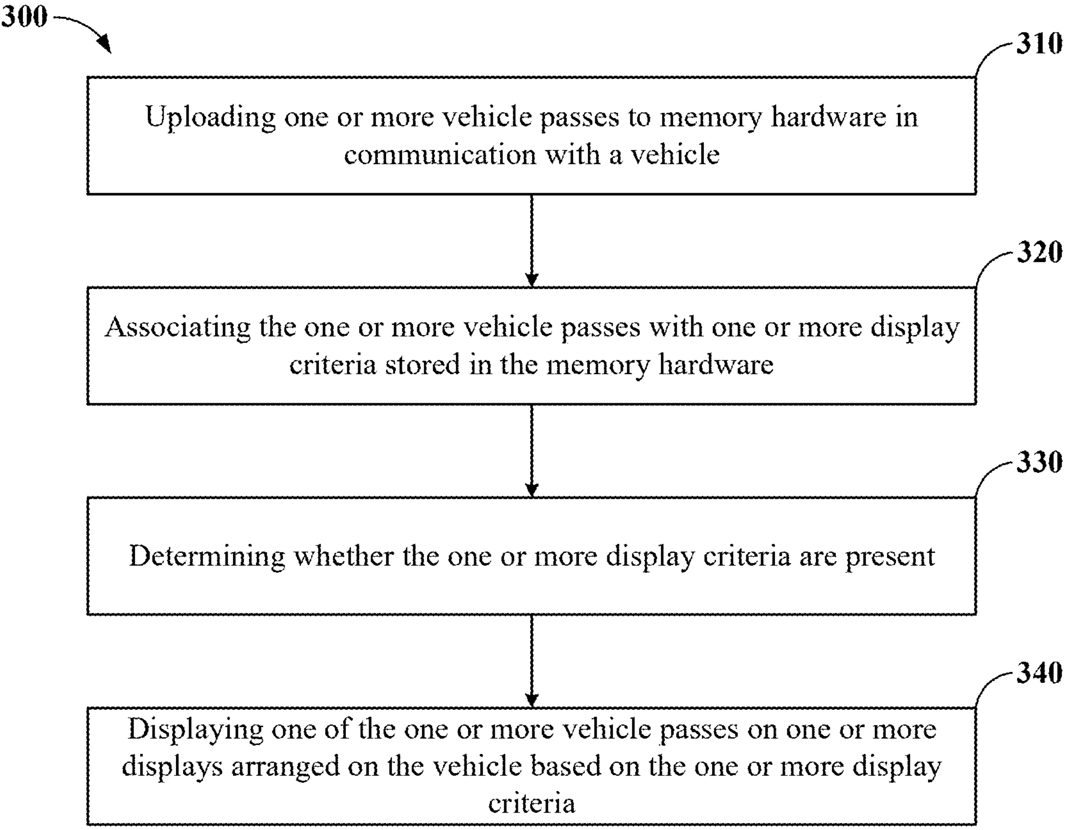
FIG. 6 is a flow chart of a method of selectively displaying one or more vehicle passes based on one or more display criteria.

According to the principles of the present disclosure, with reference to FIG. 6, a method 300 is provided and in general, continuously assesses one or more display criteria 302 (FIG. 5) and selectively displays the one or more vehicle passes 161 on the one or more displays 144 depending on which of the display criteria is present.

At 310, the one or more vehicle passes 161 can be uploaded to the memory hardware in communication with the vehicle 100. For instance, the one or more vehicle passes 161 can be uploaded to the memory hardware 214 arranged on the vehicle or the remotely located computing system 50. According to one aspect, uploading the one or more vehicle passes to the memory hardware can include providing credentials (e.g., a username and password) for one or more driver profiles or accounts associated with the one or more vehicle passes 161. According to one aspect, a user can provide their credentials via an applet or web address on the mobile device 40 or via the infotainment system, for example. According to at least one aspect, uploading the one or more vehicle passes 161 can include capturing one or more photos of the one or more vehicle passes 161 with the mobile device 40.

At 320, the one or more vehicle passes 161 can be associated with one or more display criteria 302 stored in the memory hardware. The one or more display criteria 302 can be automatically associated with or manually assigned to the one or more vehicle passes 161. The one or more display criteria 302 may include a specific location (e.g., latitude and longitude), intercountry or interstate travel, a business name, or a type of business (e.g., gas station). As introduced above, a location of the vehicle 100 can be continuously determined as the vehicle 100 moves within the vehicle operating environment 10. Additionally or alternatively, the one or more display criteria 302 can include the mobile device 40 being in the vicinity of the vehicle 100 or the key fob or digital key 34 being in the vicinity of the vehicle 100. The mobile device 40 and/or the key fob 34 can be identified with the wireless low-energy module 222, the UWB module 224, and/or the NFC module 226, for example. Additionally or alternatively, the one or more display criteria 302 can include a manual input from a user of the vehicle 100. In other words, the user can manually select one of the one or more vehicle passes 161 via the infotainment system 170 and/or via the mobile device 40 to be displayed on the one or more displays 144. Additionally or alternatively, the one or more display criteria can include a crash or accident involving the vehicle 100. In at least one configuration, the display criteria includes data concerning a driver or user's routine and/or schedule (e.g., daily, weekly, monthly, yearly). In other words, a specific vehicle pass of the one or more vehicle passes 161 can be displayed on the one or more displays 144 based on a location, time of day, month, and/or day of the week, for example.

At 330, the vehicle management system 200 or another system in communication with the vehicle 100 can determine whether the one or more display criteria 302 are present. In the present illustrative configuration, the video control unit 206 can be configured to determine whether the one or more display criteria 302 are present. For instance, the video control unit 206 can determine whether a user provided a manual input via the infotainment system 170 or via the mobile device 40 to display one of the one or more vehicle passes 161. The video control unit 206 can continuously evaluate the GPS data of the vehicle 100 and determine whether the vehicle 100 is located near a specific location, at a business, or crossing a border from one state to another or from one country to another. More particularly, the one or more vehicle passes 161 can be displayed if the video control unit 206 recognizes that the vehicle 100 is within a boundary or on roads that surround a certain business, establishment, parking complex, etc. Additionally, the video control unit 206 can be configured to evaluate whether the mobile device 40 or the key fob 34 is within the vicinity of the vehicle 100. The video control unit 206 can also continuously evaluate sensor data from the sensor system 178 and determine whether the vehicle 100 has been involved in an accident. Additionally or alternatively, the one or more vehicle passes 161 can be displayed if the video control unit 206 receives data that suggests that a camera or another sensor of the sensor system 178 detected a business, a sign, etc.

At 340, the one or more vehicle passes 161 can be displayed on the one or more displays 144 arranged on the vehicle 100 based on the one or more display criteria 302. As mentioned above the one or more vehicle passes 161 can include the barcode 164, the QR code 166, text and/or the emblem 162. In one example, if the user of the vehicle 100 has a membership for a car wash the video control unit 206 can detect when the vehicle 100 is near the car wash and display the one or more vehicle passes 161 on the one or more displays 144 so that the detection device 32 can scan or read the one or more vehicle passes 161. In another example, the vehicle 100 may need one type of toll pass to travel certain roads in one state or country and need a different pass to travel certain roads in another state or country, so the video control unit 206 can detect when the vehicle 100 crosses a boarder of a state or country and begin to display an appropriate toll pass on the one or more displays 144. In yet another example, if the video control unit 206 detects that the vehicle 100 has been involved in an accident, a user's critical medical information (e.g., user is prescribed to blood thinners and is a type 1 diabetic) can be displayed on the one or more displays 144 to alert emergency response professionals. In the event that the one or more displays are inoperable as a result of an accident, the medical information can be announced via the speakers of the vehicle 100, for example.

A number of implementations have been described. Nevertheless, it will be understood that various modifications may be made without departing from the spirit and scope of the disclosure. Accordingly, other implementations are within the scope of the following claims.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A computer-implemented method that, when executed by data processing hardware, causes the data processing hardware to perform operations comprising:

obtaining, using an infotainment system of a vehicle, a first password from an operator of the vehicle;

determining that the first password from the operator matches a second password associated with a driver profile of the vehicle;

based on the first password matching the second password, uploading a vehicle pass to memory hardware in communication with the vehicle, wherein the vehicle pass includes medical information for the operator;

associating the vehicle pass with display criteria stored in the memory hardware, wherein the display criteria comprise whether the vehicle has been involved in an accident;

determining that the display criteria are present; and based on determining that the display criteria are present, displaying the vehicle pass on one or more electronic displays arranged on the vehicle on at least one of a windshield, a rear window, or a side window of the vehicle such that the one or more electronic displays are externally viewable from outside the vehicle.

2. The method of claim 1, wherein uploading the vehicle pass to the memory hardware includes capturing a picture of the vehicle pass with a mobile device.

3. The method of claim 1, wherein the display criteria further include global positioning system (GPS) data.

4. The method of claim 3, wherein determining whether the display criteria are present further includes continuously evaluating the GPS data.

5. The method of claim 1, wherein determining whether the display criteria are present further includes determining whether the vehicle pass was manually selected using the infotainment system of the vehicle.

6. The method of claim 1, wherein determining whether the display criteria are present further includes evaluating whether a key fob or digital key is in the vicinity of the vehicle.

7. The method of claim 1, wherein determining whether the display criteria are present further includes evaluating whether a mobile device is in the vicinity of the vehicle.

8. The method of claim 1, wherein displaying the vehicle pass on the one or more electronic displays further includes displaying at least one of a barcode or a quick-response (QR) code.

9. The method of claim 1, wherein displaying the vehicle pass on the one or more displays further includes displaying at least one of plain text or an emblem.

10. A system comprising:

one or more electronic displays arranged on a vehicle on at least one of a windshield, a rear window, or a side window of the vehicle such that the one or more electronic displays are externally viewable from outside the vehicle;

an infotainment system;

data processing hardware; and memory hardware in communication with the data processing hardware, the memory hardware storing instructions that, when executed on the data processing hardware, cause the data processing hardware to perform operations comprising:

obtaining, using the infotainment system, a first password from an operator of the vehicle;

determining that the first password from the operator matches a second password associated with a driver profile of the vehicle;

based on the first password matching the second password, uploading a vehicle pass to the memory hardware;

associating the vehicle pass with display criteria stored in the memory hardware, wherein the display criteria comprise whether the vehicle has been involved in an accident;

determining that the display criteria are present; and based on determining that the display criteria are present, displaying the vehicle pass on the one or more electronic displays.

11. The system of claim 10, wherein the display criteria further include global positioning system (GPS) data.

12. The system of claim 11, wherein determining whether the display criteria are present further includes continuously evaluating the GPS data.

13. The system of claim 10, wherein displaying the vehicle pass on the one or more electronic displays further includes displaying at least one of a barcode or a quick-response (QR) code.

14. The system of claim 10, wherein displaying the vehicle pass on the one or more electronic displays further includes displaying at least one of plain text or an emblem.

15. A vehicle management system of a vehicle, comprising:

a sensor system including one or more sensors coupled to the vehicle;

an infotainment system;

one or more electronic displays arranged on the vehicle on at least one of a windshield, a rear window, or a side window of the vehicle such that the one or more electronic displays are externally viewable from outside the vehicle;

data processing hardware; and memory hardware in communication with the data processing hardware, the memory hardware storing instructions that, when executed on the data processing hardware, cause the data processing hardware to perform operations comprising:

obtaining, using the infotainment system, a first password from an operator of the vehicle;

determining that the first password from the operator matches a second password associated with a driver profile of the vehicle;

based on the first password matching the second password, uploading a vehicle pass to the memory hardware;

associating the vehicle pass with display criteria stored in the memory hardware, wherein the display criteria comprise whether the vehicle has been involved in an accident;

determining that the display criteria are present; and based on determining that the display criteria are present, displaying the vehicle pass on the one or more electronic displays.

16. The vehicle management system of claim 15, wherein determining whether the display criteria are present further includes continuously evaluating GPS data.

17. The vehicle management system of claim 15, wherein determining whether the display criteria are present further includes evaluating whether a mobile device is in the vicinity of the vehicle.

18. The vehicle management system of claim 15, wherein displaying the vehicle pass on the one or more electronic displays further includes displaying at least one of a barcode or a quick-response (QR) code.

19. The vehicle management system of claim 15, wherein displaying the vehicle pass on the one or more electronic displays further includes displaying at least one of plain text or an emblem.

* * * * *